Patented Dec. 24, 1940

2,225,783

UNITED STATES PATENT OFFICE 2,225,783

SAUSAGE TREATMENT

Lloyd B. Jensen and Levi S. Paddock, Chicago, Ill.

No Drawing. Application April 7, 1939, Serial No. 266,537

12 Claims. (Cl. 99—109)

This invention relates to a method of preparing sausage.

One of the objects of this invention is to provide a method of improving the organoleptic properties of sausage.

Another object of this invention is to provide a method whereby the organoleptic properties of sausage may be controlled.

Another object of this invention is to provide a method of preparing sausage of the Thuringer type, including Lebanon bologna.

Other objects and advantages of our invention will become apparent from the description and claims which follow.

We have discovered that in the production of certain types of sausage, certain types of microorganisms may be employed to ferment sugars present to form acids and other products which tend to prevent or inhibit the growth and enzymatic action of putrefactive bacteria, toxigenic bacteria, and food poisoning organisms. We have discovered that the sausage material may be inoculated with Lactobacilli to improve the organoleptic properties of the finished product and to inhibit the growth and enzymatic action of undesirable organisms which may be present in the sausage material.

In preparing various types of sausages, such as Thuringer sausage, Essex sausage, and Lebanon bologna, considerable difficulty is encountered during processing of the sausage either due to the rupturing of the casing during processing or due to the growth of putrefactive and other undesirable organisms. Rupturing of the casing during processing may be said to be a result of the growth of undesirable organisms since the casings are ruptured by the formation of gas in the interior of the sausage during the growth of these organisms. In the practice of our invention, the sausage material is inoculated with Lactobacilli, which are permitted to grow in the sausage mix and to ferment the sugars present to form lactic acid and other end products. The lactic acid and perhaps some of the end products of this fermentation prevent or inhibit the growth and enzymatic action of putrefactive bacteria and other undesirable organisms.

According to the published literature, the production of these meat products is dependent upon certain smokehouse facilities and climatic conditions which are found in only a small region. It has also been considered that successful production of these meat products involved the employment of certain trade secrets. We have discovered that the successful production of these types of meat products was not dependent upon the locality or upon any trade secrets, but was due to causes heretofore unknown. We have discovered that the successful production of these meat products was due to "chance inoculation." The organoleptic properties of the products could not be controlled, and the desired properties were or were not imparted to the meat products, depending upon whether or not the desired organisms were present by chance. The smokehouse facilities and climatic conditions are of minor importance in the production of these types of meat products. Our discovery fully accounts for the fact that certain types of sausage could be produced successfully only in certain definite localities. Although these types of sausage could be prepared in certain localities, large proportions of sausage were lost because of the growth in the sausage during the processing of undesirable organisms.

Sausage which is prepared by inoculating the ingredients with a culture of Lactobacilli has an improved "tangy" flavor. The "tang" may be controlled by the proportion of Lactobacilli culture which is added to the ingredients and the subsequent smoking period or heat treatment. The final product has a pink or dark pink color whereas, in general, sausage prepared according to conventional methods has a dark red or dark reddish brown color. The texture of the inoculated sausage is in general much smoother and more compact than uninoculated sausage. The smoothness in texture and more compact texture results from a suppression of the growth of the undesirable organisms with a resulting formation of gases which produce a less compact and non-uniform texture.

In preparing a culture for use in the preparation of meat products according to our invention, a single species or a mixture of species of Lactobacilli may be grown in milk or in certain carbohydrate broths. The culture may then be used to inoculate the sausage ingredients. By employing such a starter, the organoleptic properties of the meat products may be controlled and will be uniform although the products may be manufactured at different localities and at different times.

To illustrate our invention, sausage of the Thuringer type may be prepared by employing ingredients in the proportions set forth below:

| | |
|---|---|
| Beef chucks or beef trimmings chopped through ⅛ inch plate | 150 lbs., 0 oz. |
| Sodium nitrate | 0 lb., 2 ozs. |
| Salt, common | 5 lbs., 0 oz. |
| Sugar | 1¼ lbs. to 5 lbs. |
| White pepper | 0 lb., 6 ozs. |
| Whole black pepper | 0 lb., 5 ozs. |

The meat, sodium nitrate, sodium chloride, and sugar are first thoroughly mixed, and the starter containing the Lactobacilli may be added together with the pepper at the last mixing operation. The quantity of starter which is added may range from ⅛ per cent to 1 per cent, by weight, depending upon the degree of "tang" desired in the finished product, other things being equal, the greater the proportion of starter, the greater the degree of "tang" for a limited definite smoking period. The mixed ingredients are then stuffed into casings and the sausage smoked or heat treated for from one day to several days at a temperature of from 95 degrees F. to 115 degrees F. The smoking or heat treating period may be reduced by inoculation of the ingredients with the Lactobacilli culture, since sufficient Lactobacilli are present to rapidly develop the desired organoleptic properties. During this processing, the Lactobacilli grow and ferment sugars to produce lactic acid and other end products which inhibit the growth of undesirable organisms and which impart the desirable organoleptic properties to the finished product.

In practicing our invention, we prefer to employ non-gas forming Lactobacilli. The gas forming Lactobacilli impart the desirable flavor and color to the meat product, but it is impossible to control the formation of gas so as to prevent rupturing of the casing during processing. If a suitable type of casing material could be secured which would permit the escape of gas as it is formed, the gas forming Lactobacilli would be satisfactory.

The biochemical characteristics of the Lactobacilli which we prefer in practicing the process of our invention are as follows:

Gelatin—no growth
Agar slant—no growth
Broth—floc, scanty growth
Milk—acid, coagulation
Potato—no growth
Indol—none formed
Nitrates—not reduced
Acid—in glucose, levulose, mannose, galactose, arabinose, sucrose, maltose, lactose, raffinose, salicin, sorbitol slow, mannite slow, xylose slow
No acid usually but some strains ferment rhamnose and inulin
Grow in salt up to 6 per cent and some strains in great concentrations
Grow: 50 degrees F. to 105 degrees F.
Killed at 167 degrees F. for 15 minutes.

The Lactobacilli cultures also contain certain coccoid forms of microorganisms, for example, *Leuconostoc mesenteroides, Leuconostoc dextranicum,* and *Leuconostoc pleofructi.* These organisms are not necessary in practicing our invention but appear to be naturally present and do affect the flavor in a slight degree.

The following Lactobacilli or mixtures of these Lactobacilli may be set forth as examples of organisms which are satisfactory for the purposes of our invention:

*Lactobacillus casei* (Orla-Jensen)—desirable for short smoke
*Lactobacillus plantarum* (Orla-Jensen)
*Lactobacillus cucumeris*—too acid for sausage, may be a variant of plantarum
*Lactobacillus pentosus*
*Lactobacillus arabinosus*
*Lactobacillus leichmannii*—variant of plantarum
*Lactobacillus acidophil*—aerogenis A—not desirable but present
*Lactobacillus acidophil*—aerogenis B—desirable
*Lactobacillus acidophil*—aerogenis H—desirable
*Lactobacillus pentoaceticus*—Lebanon
*Lactobacillus wehmeri*—forms a slightly vinous odor
*Lactobacillus lycopersica*—forms gas in Lebanon
*Lactobacillus gayoni*
*Lactobacillus mannitopoeus*

In the preparation of meat products and sausage in accordance with our invention, it is possible to greatly reduce the amount of sugar required to impart the desired flavor to the finished product. Since the predominating organisms are the added Lactobacilli, sufficient lactic acid and other end products are rapidly formed to inhibit or prevent the growth of the undesired organisms, and hence only sufficient sugar need be present to form the desired fermentation products. Very small amounts of sugar are fermented by undesired organisms and the Lactobacilli have substantially no competition in their fermentation of sugars.

Although it has been impossible to prepare Thuringer types of sausage in casings of cellulose film or other casings which do not "breathe," we have, by our process, prepared such types of sausage in cellulosic casings. The cellulosic casings are substantially impervious whereas natural casings "breathe" or are sufficiently porous to permit the slow escape of gas generated in the sausage. By the use of non-gas forming Lactobacilli, the undesirable organisms are masked and no gas will be formed during the processing of the sausage to rupture the casing.

We claim:

1. The method of preparing meat products which comprises inoculating comminuted meat with Lactobacilli and permitting the Lactobacilli to grow therein.

2. The method of preparing sausage products which comprises inoculating the sausage products with Lactobacilli and thereafter permitting the Lactobacilli to grow therein.

3. The method of preparing sausage products which comprises inoculating a sausage mix with Lactobacilli, thereafter subjecting the mix to the action of heat, and permitting the Lactobacilli to grow therein.

4. The method of preparing sausage which comprises inoculating sausage ingredients with Lactobacilli, thereafter processing the sausage at a temperature of from 95 degrees F. to 105 degrees F., and permitting the Lactobacilli to grow therein.

5. The method of preparing sausage which comprises inoculating the sausage with from ⅛ per cent to 1 per cent of a starter containing Lactobacilli and thereafter smoking the sausage at a temperature of from 95 degrees F. to 105 degrees F.

6. In a method of preparing sausage, the steps which comprise inoculating sausage ingredients with Lactobacilli and thereafter permitting the Lactobacilli to grow therein.

7. In a method of preparing sausage, the steps which comprise inoculating sausage ingredients with from $\frac{1}{8}$ per cent to 1 per cent Lactobacilli and thereafter permitting the Lactobacilli to grow therein.

8. The method of preparing sausage which comprises inoculating the sausage ingredients with non-gas forming Lactobacilli and thereafter permitting the Lactobacilli to act upon said ingredients.

9. The method of preparing sausage which comprises inoculating the sausage ingredients with non-gas forming Lactobacilli and thereafter subjecting the ingredients to the action of heat and permitting the Lactobacilli to act upon said ingredients.

10. The method of preparing sausage which comprises inoculating the sausage ingredients with non-gas forming Lactobacilli and thereafter processing the sausage at a temperature of from 95 degrees F. to 105 degrees F. and permitting the Lactobacilli to act upon said ingredients.

11. The method of preparing sausage which comprises inoculating the sausage ingredients with from $\frac{1}{8}$ per cent to 1 per cent of a starter containing non-gas forming Lactobacilli and thereafter smoking the sausage at a temperature of from 95 degrees F. to 105 degrees F. and permitting the Lactobacilli to act upon said ingredients.

12. The method of inhibiting the growth of undesirable microorganisms in comminuted meat products which comprises inoculating the ingredients of the products with Lactobacilli and permitting the Lactobacilli to act upon said ingredients.

LLOYD B. JENSEN.
LEVI S. PADDOCK.